United States Patent

Peterson et al.

[15] 3,702,379

[45] Nov. 7, 1972

[54] DATA TRANSFERRING SYSTEM UTILIZING FRAME AND BIT TIMING RECOVERY TECHNIQUE

[72] Inventors: James W. Peterson, Elmhurst; John A. Tempka, Glenview, both of Ill.

[73] Assignee: Motorola, Inc., Franklin Park, Ill.

[22] Filed: Aug. 6, 1970

[21] Appl. No.: 61,730

[52] U.S. Cl.............................179/15 BS, 179/15 BP

[51] Int. Cl................................................H04j 3/06

[58] Field of Search..179/15 BP, 15 AD, 15 AL, 15 BS, 179/15 FD, 15 FE, 2 DP; 325/41, 42

[56] References Cited

UNITED STATES PATENTS

| | | | |
|---|---|---|---|
| 3,355,553 | 11/1967 | Miyagi | 179/15 BS |
| 3,182,132 | 5/1965 | Barnes | 179/15 BP |
| 3,404,229 | 10/1968 | Downey | 179/15 BP |
| 3,450,842 | 6/1969 | Lipke | 179/15 BP |
| 3,390,233 | 6/1968 | Brothman | 325/41 |

*Primary Examiner*—Kathleen H. Claffy
*Assistant Examiner*—David L. Stewart
*Attorney*—Mueller and Aichele

[57] ABSTRACT

The transmitter-encoder of the data transferring system includes a combiner which develops an information signal by sequentially sampling the output states of a plurality of data sources. A timing signal generator develops bit and frame timing control signals for the combiner and a carrier and two pilot signals which are synchronized with the control signals to facilitate timing recovery at a receiver-decoder of the data transferring system. A composite signal comprised of an encoded information signal, carrier and pilots is transferred to the receiver through a medium which might produce abnormal information, such as an undesired frequency shift or phase perturbations, in the signal at the receiver-decoder input. The receiver includes circuitry which derives the carrier signal to facilitate demodulation. A demodulation circuit establishes the difference of each of the pilot signals and the encoded information signal from the carrier to produce two difference mixing signals and a difference information signal which have any frequency shift caused by the medium eliminated therefrom. One of the two difference mixing signals is utilized to reconstruct the bit timing signal and the other mixing signal along with a control signal derived from the bit timing signal is utilized to provide a frame timing signal which does not have any frequency or phase ambiguity. The bit and frame timing signals operate a bit separator included in the receiver which selectively channels the decoded data from the information signal to each of a plurality of data utilization devices corresponding to each of the data sources. A monitor signal which is synchronized with the data signal and which has a known pulse code may form part of the information signal to facilitate secure data transmission.

17 Claims, 12 Drawing Figures

PATENTED NOV 7 1972 3,702,379

SHEET 1 OF 6

Inventors
JAMES W. PETERSON
JOHN A. TEMPKA
BY
[signature]
Attys.

DATA TRANSFERRING SYSTEM UTILIZING FRAME AND BIT TIMING RECOVERY TECHNIQUE

CROSS REFERENCE TO RELATED APPLICATION

The subject matter of the present application is related to the subject matter of the application of the same inventors entitled, "Data Transferring System Utilizing A Monitor Channel and Logic Circuitry to Assure Secure Data Communications," Ser. No. 61,729, filed Aug. 6, 1970, and which is assigned to the same assignee as the present application.

BACKGROUND OF THE INVENTION

Data transferring systems are often required which can communicate data from a data source to a data utilization device located many miles apart and which can discriminate against any errors in the data. Such data transferring systems are required by electric utility companies, for example, to exchange information between protective relays relating to electrical quantities being measured at selected points along power transmission lines. This information is utilized to trip enormous circuit breakers controlled by the protective relays to thereby disconnect a particular transmission line having a fault thereon from a power distribution system thus protecting the line, equipment and lives associated therewith. Since it is important that such a power line not be inadvertently connected or disconnected, it is essential that the data transferring system used therewith have a high degree of operational reliability, security against false outputs, and speed of information exchange. Moreover, it is desirable that the data transferring system provide essentially simultaneous communication between a plurality of protective relays.

In the past, frequency shift keying (FSK) in combination with frequency division multiplexing (FDM) techniques have typically been utilized to transfer information between a plurality of protective relays, usually via base band or voice band channels. Although these systems generally provide satisfactory information transfer, some types thereof are susceptible to errors, resulting from frequency shift, caused by either the transmission medium or by the equipment. For example, single sideband multiplex modulation equipment includes a master oscillator which develops a mixing signal utilized to translate the mark and space frequencies of the FSK system into various frequency ranges. The single sideband demodulation equipment, likewise, includes a master oscillator for producing a mixing frequency which is utilized to translate the mark and space frequencies back to their original frequencies. If the master frequency oscillator of the modulator or of the demodulator is improperly tuned, or perturbed by transmission medium abnormalities, the original mark and space frequencies will not be developed at the receiver. If the master oscillator of the modulator, for instance, is detuned an amount equal to the difference between the mark and space frequency of FSK system, the receiver will interpret marks as spaces or spaces as marks. Moreover, the transmission system might also produce unwanted frequency shifts or phase shifts in pilot or control signals which are transmitted to facilitate frame and bit timing recovery.

To guard against these possibilities, prior art FSK/FDM equipment includes narrow bandwidth filters which can discriminate against un-wanted signals, and the mark-space frequency difference may be increased as compared to the difference normally employed. Moreover, additional frequency channels have also been used.

These techniques, however, are disadvantageous in some applications. For instance, since the narrow bandwidth filters delay signals passing therethrough, the amount of time necessary to transfer a given bit of information from the input to the output of the FSK receiver is increased, thus increasing the time between when a faulty line is detected and when the line is disconnected from the system. Moreover, the increase in mark-space frequency difference increases the bandwidth requirement. In some applications, bandwidth constraints are imposed by dense channel utilization or by the desire to send the data over a commonly available "voice band" transmission cable, which has a relatively narrow bandpass. In these applications, FSK/FDM techniques may not provide an adequate data transmission rate, particularly when majority logic security operations are employed and a plurality of protective relays are being simultaneously controlled.

SUMMARY OF THE INVENTION

An object of the invention is to provide a data transmission system which facilitates secure information transfer at high speed in a constrained bandwidth.

Another object of the invention is to provide a digital transmission system suitable for relaying control information between a plurality of protective relays.

Still another object of the invention is to provide a bit and frame timing recovery system which is operational even though the controlling signals therefor are subjected to undesired frequency or phase shift by the transmission medium.

A further object of the invention is to provide a data transmission system including circuitry for removing an unwanted shift in frequency of the components of an information signal caused by the transmitting medium.

The data transferring system includes a transmitter-encoder and receiver-decoder. The transmitter-encoder includes a combiner which sequentially samples the outputs of a plurality of data sources to thereby develop a serial bit stream. A timing generator develops bit and frame control signals for controlling the combiner which are synchronized with a carrier signal and first and second pilot frequencies. The transmitter also includes an encoder which transforms the serial bit stream into an encoded ternary data waveform, which after being filtered has a frequency spectrum suitable for being translated, by combining the carrier therewith, into the passband of and sent either over a voice band transmission line or over other media to the receiver-decoder. The carrier and pilot signals have frequencies at the edges of the frequency spectrum of the shifted data signal so that they can be transmitted with the data waveform. The transmission medium is capable of producing an unwanted frequency or phase shift in the composite signal comprised of the encoded data signal, carrier and pilots.

The receiver-decoder includes a frequency selective means for deriving the carrier signal which is then applied to one input of a mixing circuit. The two pilot frequencies and the encoded data signal are applied to another input of the mixing circuit. The mixing circuit develops mixing components equal to the difference between the frequency of the carrier and the frequencies of each of the pilot signals and the frequency band of the encoded signal. Since these mixing components are dependent on the difference between the frequency of the carrier signal and the frequencies of the respective pilot and encoded data signals, any frequency shift caused by the transmission medium in the composite signal will be eliminated from the mixing products. One of the mixing signals is utilized to reconstruct the bit timing signal and the other of the mixing signals in combination with a signal derived from the bit timing signal is utilized to reconstruct the frame timing signal. A slicer or full wave rectifier converts the data waveform back into the serial bit stream which is applied along with the frame and bit timing signals to a bit separator. The bits are channeled by the separator to each of a plurality of data utilization devices corresponding to each of the aforementioned data sources. A monitor signal which is synchronized with the combiner control signals and which has a known pulse code is utilized to facilitate secure data transmission.

DESCRIPTION OF THE PREFERRED EMBODIMENT

Figures 1, 2:
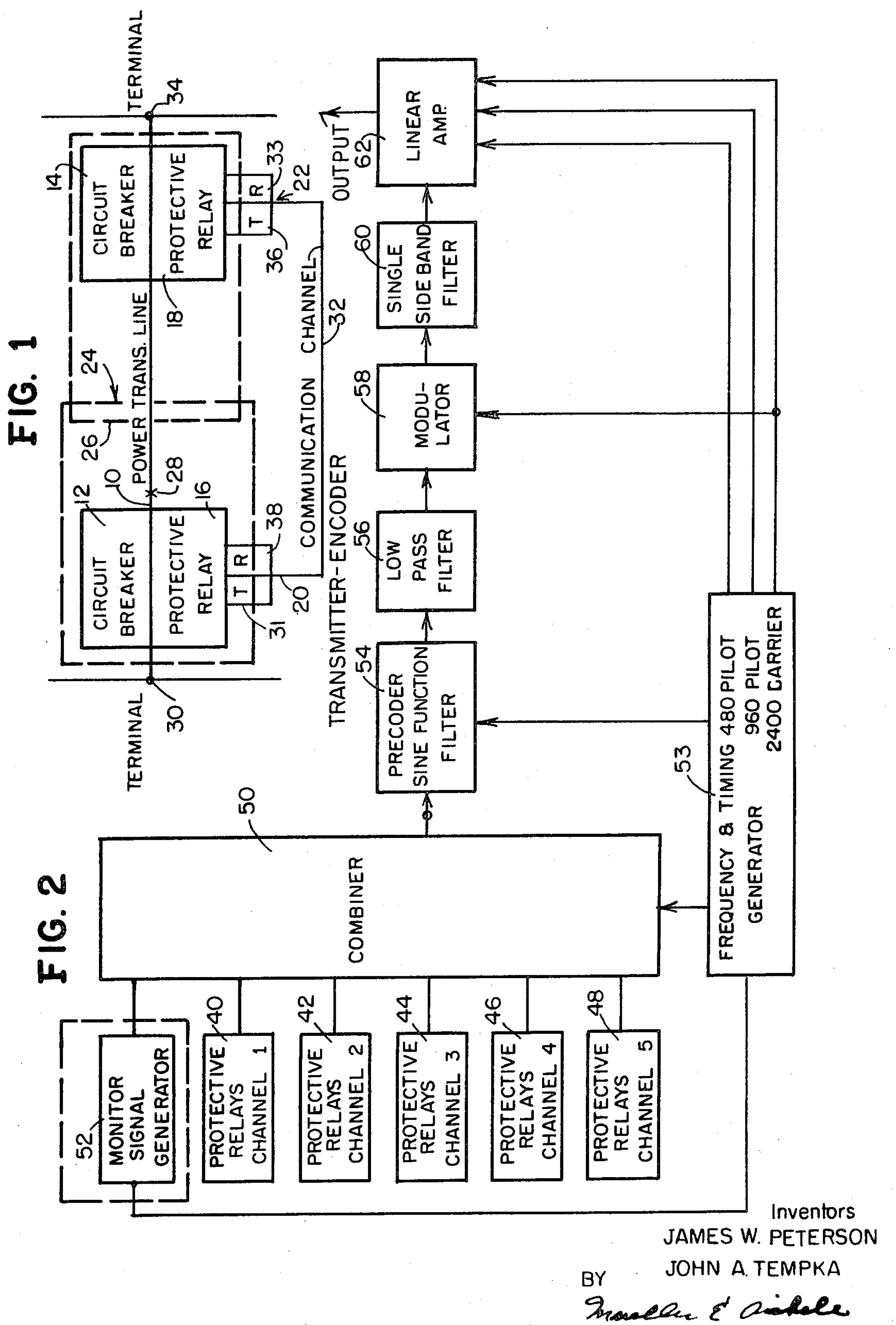
FIG. 1 is a block diagram illustrating a power transmission line, circuit breakers, protective relays, and a data transferring system operating over a communications link.
FIG. 2 is a block diagram of a transmitter-encoder of one embodiment of the invention.

To facilitate an understanding of the requirements of a system of one embodiment of the invention the environment of one possible application thereof will first be described. Referring to FIG. 1, electrical utility companies utilize power transmission lines, represented by line 10, for transferring electrical power at voltages up to 750,000 volts over distances of many miles. To protect line 10, and the equipment and lives associated therewith, enormous circuit breakers, for instance 12 and 14, are located at strategic points in the power distribution system. These circuit breakers (12 and 14) are respectively controlled by fault-sensing, protective relays 16 and 18 which continuously monitor electrical quantities associated with the lines to determine whether the power system is performing properly and if not, to determine where the trouble is located. If a fault occurs on line 10, information is relayed or transferred through interfacing communication equipment 20 and 22 which may operate over a microwave link. Communication equipment 20 and 22 is coupled with respective relays 16 and 18, to appropriate circuit breakers which open to isolate the rest of a power system from line 10 and to remove power going to line 10.

Different monitoring schemes have been developed to protect electrical power transmission systems. FIG. 1 discloses the basic elements of a commonly used direct transfer trip (DTT) protective relaying system. In the DTT relaying scheme, relay 16 may be set to monitor transmission line 10 toward but underreaching relay 18 as indicated by dashed lines 24. The normal output level of the protective relay is a "0" or low state but if a fault is detected the protective relay provides an increased DC level or "1" trip signal at its output. Similarly, relay 18 may be set to monitor transmission line 10 toward but underreaching relay 16 as indicated by dashed lines 26. If a fault occurs, for instance, within the zone being monitored by relay 16 at point 28, relay 16 will trip local circuit breaker 12 near terminal 30, and transmitter 31 will send a continuous control or "change of state" signal which signifies the existence of the trip signal or "1" at the output of relay 16 over relaying channel 32 through receiver 33 to relay 18 which will open breaker 14. Hence, in the event of an overload on line 10, either protective relay 16 or 18 may detect the fault and transmit a control signal to the other relay thereby opening circuit breakers 12 and 14. In the DTT scheme the transmission and processing of the change of state signal should occur within the shortest time from when a fault is detected.

Alternatively, a phase comparison (PC) scheme is sometimes utilized wherein the line currents at the end of transmission line 10 adjacent terminal 34, for instance, are converted into a single phase signal which alternates between either of two DC levels. The phase of this signal is transmitted over relaying channel 32 to relay 16 for comparison with the phase of the local signal at relay 16 to determine whether there is a fault on the line. Hence, in either of the foregoing schemes a data transferring system 20 and 22 is required which can transfer a digital or two level control signal from relay 16 to relay 18 or from relay 18 to relay 16, or both, through relaying channel 32 which may be either a transmission line or a microwave link. It is important that this data transferring system include security for discriminating against false control signals and that the signal processing time be minimum for the available bandwidth.

FIG. 2 is a block diagram of a transmitter-encoder which derives data from a plurality of data sources or protective relays 40, 42, 44, 46 and 48 which are similar to relays 16 and 18 of FIG. 1 but which respectively utilize channel 1, channel 2, channel 3, channel 4 and channel 5 of the data transferring system which are similar to channel 32. Combiner 50 and monitor signal generator 52, which utilize channel 0, are both controlled by frequency and timing generator 53. Monitor signal generator 52 develops a pulse train of known format or of known pulse code which, after it has been demodulated at the receiver, is used to determine whether the data transferring system is operating error free. Combiner 50 sequentially samples the parallel outputs of monitor signal generator 52 and protective relays 40, 42, 44, 46 and 48 to develop a serial binary data stream at its output.

Precoder and sine function filter 54 is connected to the output of combiner 50 and converts the binary bit stream into a three level or ternary waveform having a predetermined frequency spectrum and no average DC component. Low pass filter 56, which is connected to the output of precoder and sine function filter 54, removes the high frequency components above a predetermined frequency from the ternary wave thereby reducing the width of its frequency spectrum. Modulator 58, which is connected both to the output of low pass filter 56 and to the carrier frequency (2,400 Hz) output of frequency and timing generator 53, amplitude modulates the carrier signal with the output of filter 56.

The output of modulator 58 is connected to single sideband filter 60 which selects the lower sideband of the amplitude modulated signal and applies it to linear amplifier 62. Frequency and timing generator 53 supplies the carrier and first (480 Hz) and second (960 Hz) pilot frequencies to linear amplifier 62. The combined or composite output signal of linear amplifier 62, which includes the carrier, pilots and correlatively encoded data, is communicated to a receiver-decoder. The particular operation and sampling frequencies of the information transferring system have been selected to be compatible with either transfer trip or phase comparison protective relaying schemes. The above combined output signal can be transmitted either over channels such as a "voice band" transmission cable, having a bandwidth from 300–3,000 Hz, or over multiplex and/or microwave equipment.

Figure 3:
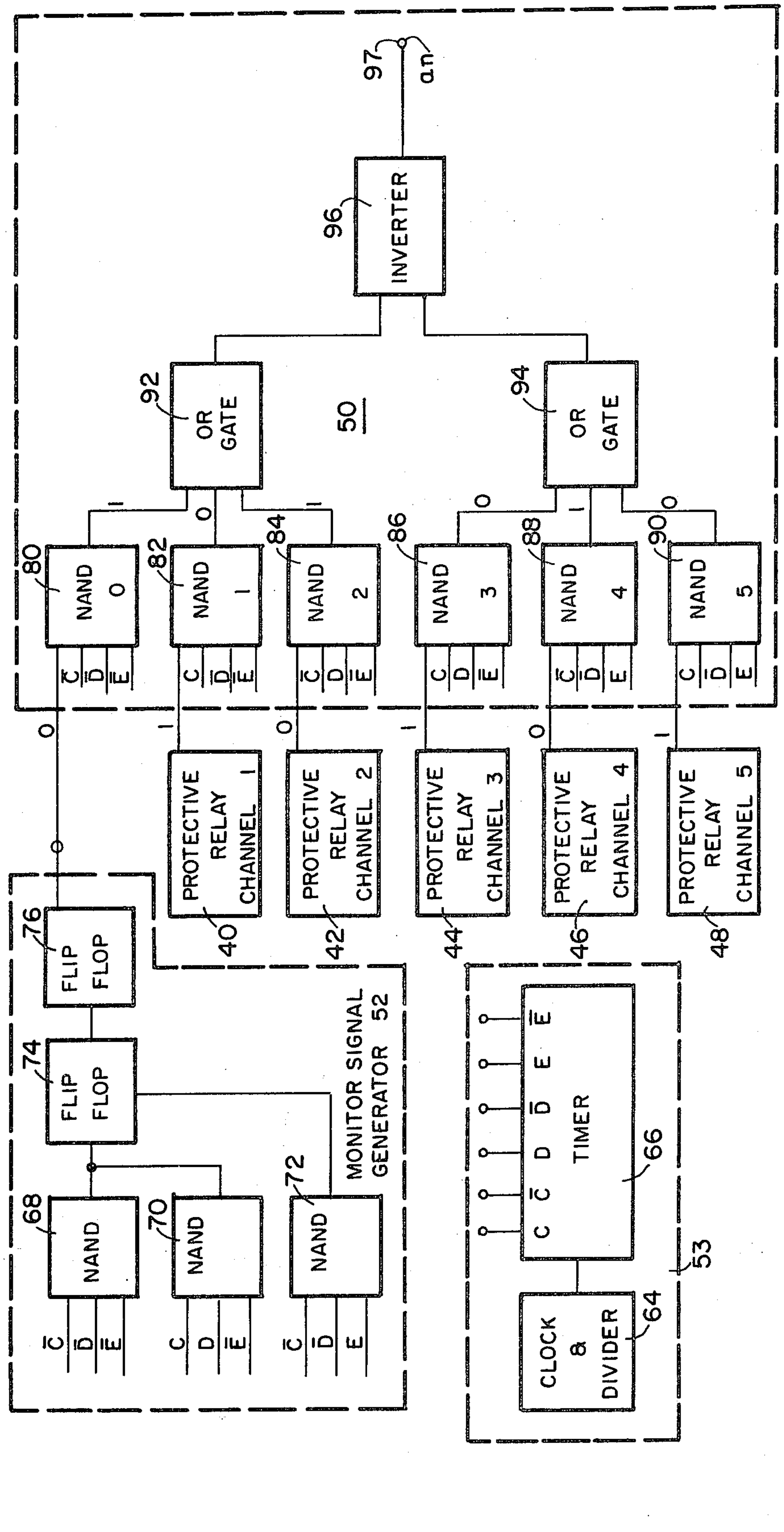
FIG. 3 illustrates the block diagram of a combiner and a monitor signal generator included in the transmitter-encoder of FIG. 2.
Figure 4:
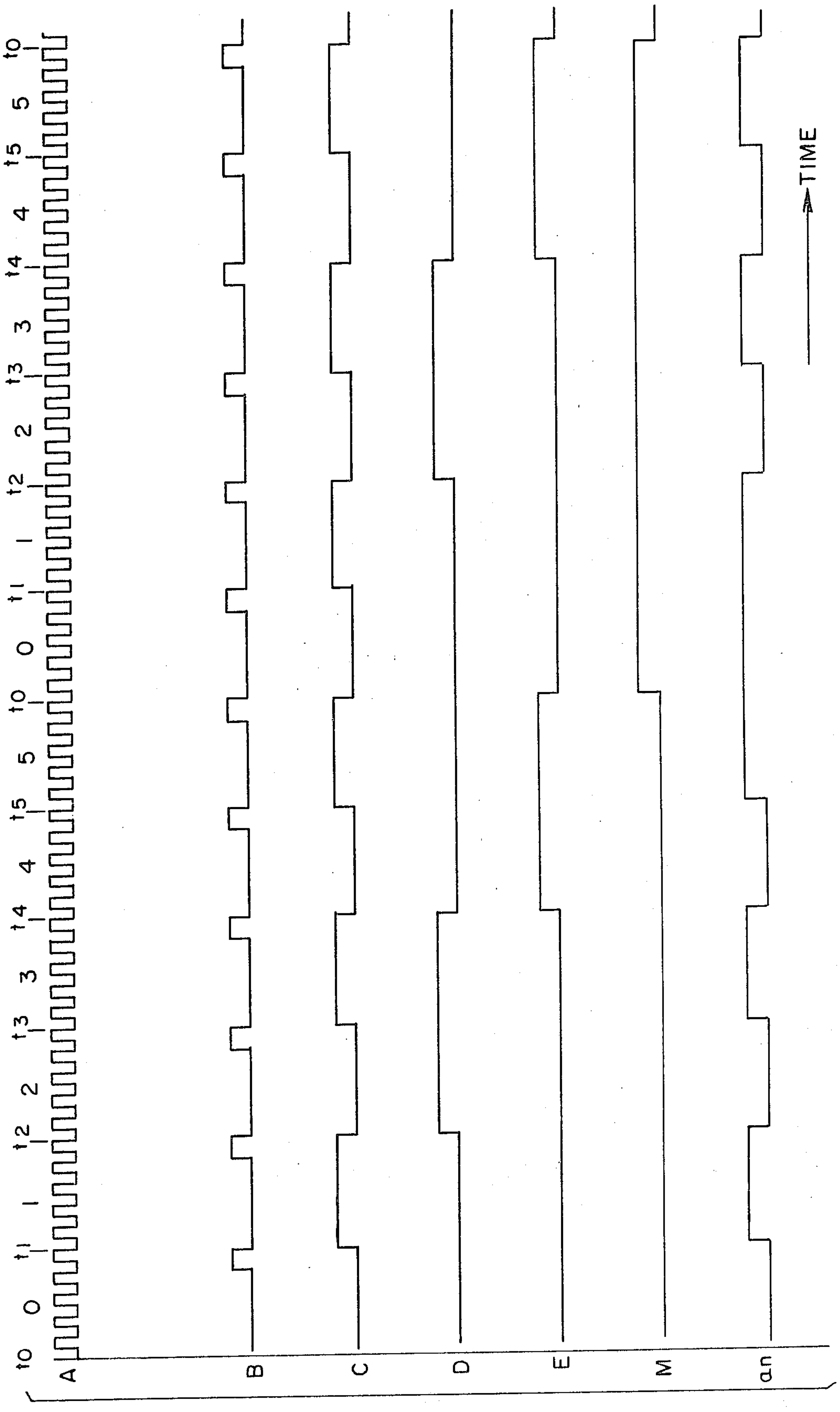
FIG. 4 is a timing diagram illustrating the operation of the combiner and generator of FIG. 3.

Referring to FIGS. 3 and 4, the operation of monitor signal generator 52 and combiner 50 will be explained in somewhat more detail. Frequency and timing generator 53 includes clock oscillator and divider 64 and timer 66. The clock oscillator, for example, might be a crystal controlled square wave generator operating at a frequency in the megahertz region. The output of clock 64 may be divided down several hundred times by known digital techniques utilizing flip-flops to produce timing pulse train A of FIG. 4 which has a repetition rate of 14,400 pulses per second (pps). Pulse train B having a repetition rate of 2,880 pps is derived by dividing A by five through the utilization of known techniques. Pulse trains C, D and E are likewise developed in a known manner from A in timer 66. Similarly, a carrier signal having a frequency of 2,400 Hz and first and second pilot signals having frequencies of 480 Hz and 960 Hz, respectively, are derived by utilizing known techniques from pulse train A. The carrier and pilot signals and pulse trains C, D and E are all phase synchronized with each other because they are all derived from the same master control signal.

To generate the monitor signal of known pulse code, the C, D, $\overline{C}$, $\overline{D}$ and $\overline{E}$ outputs of timer 66 are connected to the inputs of NAND gates 68, 70 and 72 included in monitor signal generator 52. The output of NAND gates 68 and 70 are both connected to the trigger input of flip-flop 74. The output of NAND gate 72 is connected to the set input of flip-flop 74. The output of flip-flop 74 is applied to the input of flip-flop 76.

NAND gate 68 is connected to provide a "0" or low level output only during the time that $\overline{C}$, $\overline{D}$ and $\overline{E}$ are applied thereto. The "bar" symbol indicates that the voltage level for the particular pulse train is inverse of the "non-bar" symbol. Thus NAND gate 68 supplies a "0" output only when B, C and D are at their low lever or "0" states which is the case during the 0 time interval between $t_0$ and $t_1$, as shown in FIG. 4. NAND gate 70 is connected to supply a "0" at its output when C, D and $\overline{E}$ is applied thereto. Thus as may be determined from FIG. 4, a square wave having a repetition rate of 960 pps is applied to the trigger input of flip-flop 74. NAND gate 72 applies a "0" or low level to the set input of flip-flop 74 only when $\overline{C}$, $\overline{D}$ and $\overline{E}$ occur. Hence, the output of flip-flop 74 is a square wave having a repetition rate of 480 pps. Flip-flop 76 divides the repetition rate of the square wave at the output of flip-flop 74 in half to provide a monitor signal or square wave M of FIG. 4 which has a rate of 240 pps. Pulse train M is the monitor signal of a known pulse code.

Combiner NAND gate 80 is arranged to provide a "1" or high level output at all times except when a "1" occurs at output 78 of flip-flop 76 in coincidence with $\overline{C}$, $\overline{D}$ and $\overline{E}$. As previously mentioned, $\overline{C}$, $\overline{D}$ and $\overline{E}$ occur during the time interval M which is subsequent to $t_0$ but prior to $t_1$. Therefore, the output of monitor signal generator 52 is sampled during the time bounded by $t_0$ to $t_1$.

Combiner NAND gate 82 is arranged to monitor the output state of protective relay 40 when C, $\overline{D}$ and $\overline{E}$ occur. It can be seen from FIG. 4 that this condition is met during the time slot bounded by $t_1$ and $t_2$. Consequently NAND gate 82 will provide a "0" if the output of protective relay 40 is a "1" during the time slot between $t_1$ and $t_2$. Similarly, combiner NAND gate 84 monitors the output of protective relay 42 during the time slot bounded by $t_2$ and $t_3$ when $\overline{C}$, D and $\overline{E}$ are present; combiner NAND gate 86 monitors the output of protective relay 44 during the time slot bounded by $t_3$ and $t_4$, when C, D and $\overline{E}$ are present; and combiner NAND gate 88 monitors the output of protective relay 46 during the time slot bonded by $t_4$ and $t_5$ when $\overline{C}$, $\overline{D}$ and E are present; and NAND gate 90 monitors the output of protective relay 48 during the time slot bounded by $t_5$ and $t_0$ of the subsequent frame, when C, $\overline{D}$ and E are present. Thus, combiner 50 sequentially samples the output states of monitor signal generator 52 and protective relays or data sources 40 through 48.

Assuming that the signal state at output 78 of monitor generator 52 is a "0;" that trip states or "1's" exist in relay 40, 44 and 48; and that trip states do not exist in relays 42 and 46, the outputs of NAND gates 80, 82, 84, 86, 88 and 90 will be as shown in FIG. 3. It is pointed out that the foregoing assumed "trip states"

normally would not exist but they are assumed in order to facilitate the illustration of operation. Thus the outputs of these NAND gates are inverted with respect to the actual states of the data sources being monitored. These output signals sequentially pass through OR gate 92, which is connected to the outputs of NAND gates 80, 82 and 84 or through OR gate 94, which is connected to the outputs of NAND gates 86, 88 and 90. Inverter 96, the inputs of which are connected to the outputs of OR gates 92 and 94, inverts the sequential outputs of the NAND gates to form a serial data stream $a_n$ at terminal 97, the state of which reflects the actual output states of the monitor signal generator and the relays. The resulting $a_n$ pulse code for the assumed output states is shown in FIG. 4. It is apparent from the above description and FIG. 4 that each time monitor signal M is sampled, its output state will have changed with respect to what it was the previous time it was sampled.

The rate at which each of the five protective relays and flip-flop 76 are sampled is defined as the bit rate, and the rate at which they are all sampled is defined as the frame rate. As can be seen from FIG. 4, the bit rate is controlled by waveform B which has a repetition rate of 2,880 pps and the frame rate is equal to that of waveform E, which has a repetition rate of 480 pps.

Figure 5:
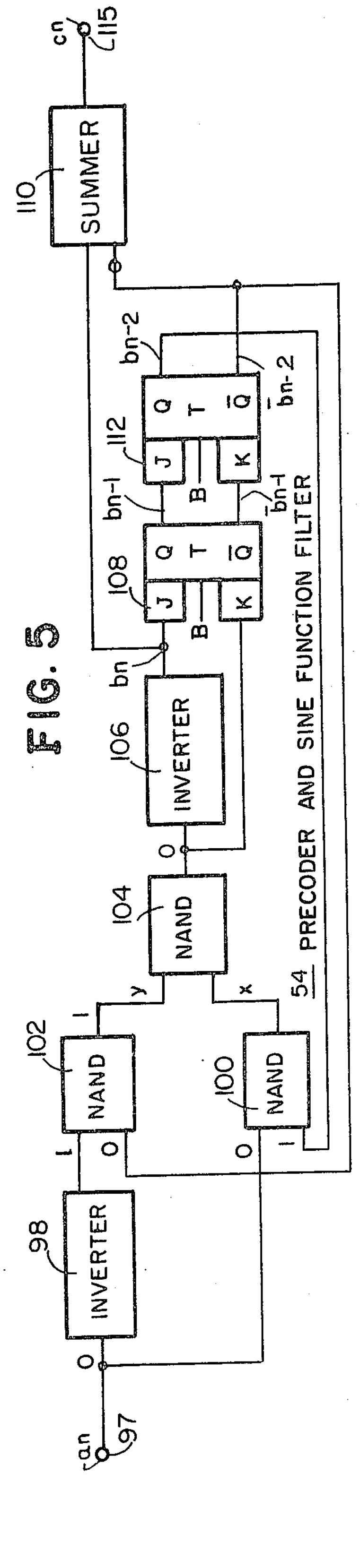
FIG. 5 is a block diagram of the precoder and sine function filter of the transmitter-encoder shown in FIG. 2.

FIG. 5 is a block diagram of precoder and sine function filter 54. Output terminal 97 of combiner 50 is directly connected to the inputs of inverter 98 and NAND gate 100. One of the inputs of NAND gate 102 is connected to the output of inverter 98. The inputs of NAND gate 104 are connected to the outputs of NAND gates 100 and 102. The input of inverter 106 and the K input of J-K flip-flop 108 are both connected to the output of NAND gate 104. The J input of J-K flip-flop 108 is connected to the output of inverter 106 and to the input of summer circuit 110. The Q and $\overline{Q}$ outputs of J-K flip-flop 108 are respectively connected to the J and K inputs of flip-flop 112. The $\overline{Q}$ output J-K flip-flop 112 is connected both to another input of NAND gate 102 and to the input of summer circuit 110, and the Q output is connected to another input of NAND gate 100. The T or trigger inputs of J-K flip-flops 108 and 112 are connected to frequency and timing generator 53 of FIG. 4 so that signal B of FIG. 4 is applied to the trigger inputs.

Figures 6, 7:
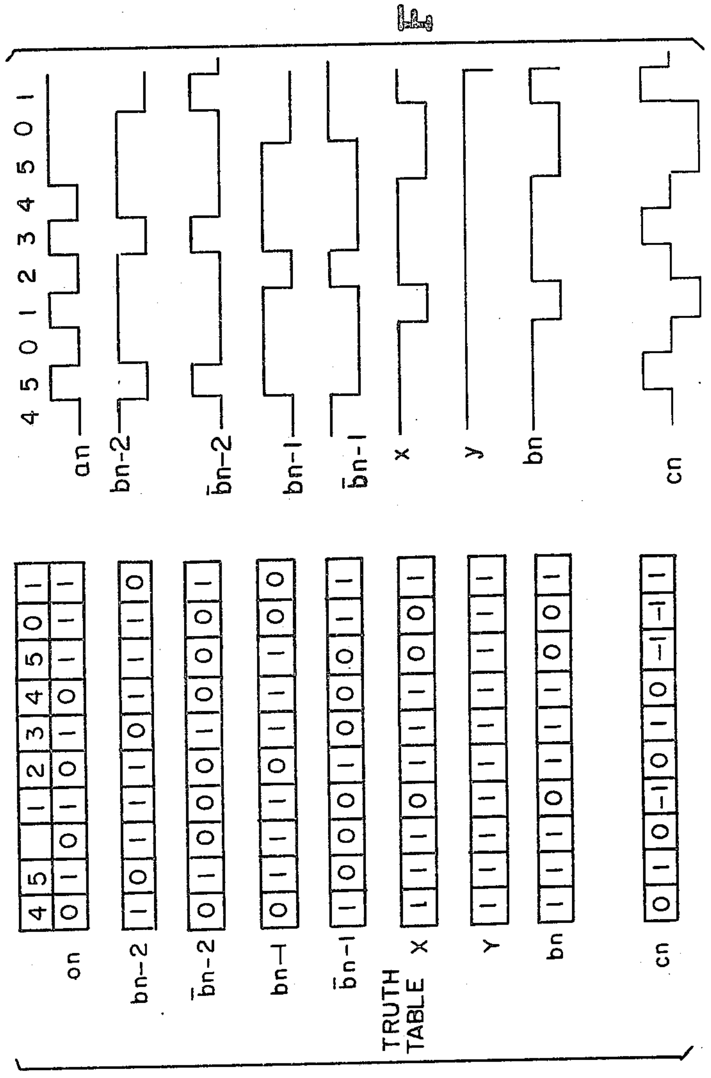
FIG. 6 is a truth table illustrating the operation of the precoder and sine function filter shown in FIG. 5.
FIG. 7 illustrates the waveforms of the pulse codes indicated in truth table in FIG. 6.

Precoder and sine function filter of FIG. 5 perform correlative polybinary encoding on the serial bit stream $a_n$ of FIG. 4, which is also shown in FIG. 7, to form a ternary signal $c_n$, also shown in FIG. 7. Correlative polybinary encoding implies that the signal to be encoded is multilevel at the sampling instant of the precoder 54 and that a particular sampled value depends upon two or more values of the original modulating or $a_n$ sequence. Some discussions involving these techniques have appeared in the literature.

To develop the precoded and sine function filtered output signal ($c_n$) precoder 54 develops an intermediate signal ($b_n$) at the output of inverter 106 from the binary information sequence $a_n$ by performing modulo-two addition $\oplus$ of the binary sequence and the intermediate signal delayed by two data bit intervals ($b_n$−2) which occurs at the Q output of J-K flip-flop 112. The mathematical expression for this operation is as follows:

$$b_n = a_n \oplus b_n - 2 \quad (1)$$

The precoded and sine function filtered output signal $c_n$ is derived by adding in summer circuit 110 the intermediate signal ($b_n$) and the inverse of the intermediate signal delayed by two data bit intervals ($\overline{b_n}$−2) which occurs at the $\overline{Q}$ output of J-K flip-flop 112. The mathematical expression for this operation is as follows:

$$c_n = b_n - b_n - 2 \quad (2)$$

The logic circuitry shown in FIG. 5 performs the operations expressed by relationships (1) and (2). To explain the operation of FIG. 5, the initial signal states are assumed as shown in the left hand or first column (4) of the truth table of FIG. 6. Hence, since the $a_n$ input to inverter 98 is a "0," its output is a "1." This "1" along with the "0" from the $\overline{b_n}$−2 or $\overline{Q}$ output of J-K flip-flop 112 are applied to NAND gate 102 to form the Y output which is a 1. Furthermore, since the $a_n$ input to NAND gate 100 is also a "0" and the $b_n$−2 input, from the Q output of J-K flip-flop 112, is a "1," the X output of NAND gate 100 is a "1." Since both the X and Y inputs to NAND gate 104 are "1' s" its output is a "0." The output of NAND gate 104, in this case a "0," passes to the K input of J-K flip-flop 108 and it passes through inverter 106 to form the $b_n$ signal, which is a "1." J-K flip-flop 108 holds a $b_n$ signal delayed by one data bit or $b_n$−1 signal which is assumed to be a "0" and the $\overline{b_n}$−1 which is therefore a "1." J-K flip-flop 112 holds a $b_n$−1 delayed by one data bit or $b_n$−2, which is a "1," and a previous $\overline{b_n}$−1 or $\overline{b_n}$−2 which is a "0." The $b_n$ signal from the output of inverter 106 and the $\overline{b}_n$−2 signal from the Q output of J-K flip-flop 112 are applied to the input of summer circuit 110 which adds the two together to form the ternary precoded output signal $c_n$. FIG. 7 depicts waveform corresponding to the digital codes set out in the truth table of FIG. 6. The relationships between the $c_n$, the $b_n$ and the $b_n$−2 signals are shown in FIG. 7.

Since over a relatively long sample, the $c_n$ signal train has as many positive-going portions as negative-going portions, its average component is zero. Thus it is seen that the $c_n$ signal is a three level waveform hence, polybinary. Furthermore since each particular sampled value of $c_n$ depends on two or more values of the original modulating sequence $a_n$, the modulating technique is described as "correlative polybinary" encoding. If the negative-going portions of the $c_n$ signal shown in FIG. 7 are converted into positive-going portions, the $a_n$ signal of FIG. 7 is derived. Hence $a_n$ signal can be reconstructed by slicing the $c_n$ signal at the receiver.

Figure 8:
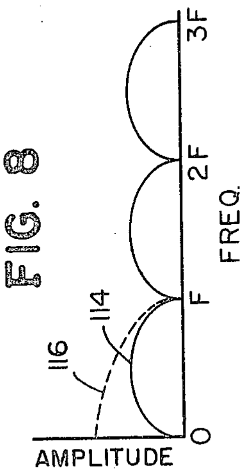
FIG. 8 shows the spectral characteristics of the sine function filter of FIG. 5 and of the low pass filter of FIG. 2.

FIG. 8 includes a graph 114 which illustrates the amplitude vs. frequency characteristic of the $c_n$ signal at output 115 of precoder and sine function filter 54. This amplitude characteristic has a periodicity of F Hertz where F is inversely proportional to the duration of each bit ($F = 1/2T$ where $T$ is the duration of the bit). For the data rate of 2,880 pps, $F$ is equal to 1,440 pps. The $c_n$ output of the precoder and sine function filter 54 is coupled to low pass filter 56, as previously mentioned in reference to FIG. 1. Since low pass filter 56 has selected upper cutoff characteristics 116, as shown in FIG. 8, it eliminates the redundant information existing at frequencies above the $F$ frequency. As previously mentioned, single sideband (SSB) modulating and filtering techniques are utilized to shift the selected frequency spectrum (0–1,440 Hz) of the filtered $c_n$ signal into a range (960–2,400 Hz) thereby developing a data frequency band which is compatible with the useful passband of a voice band transmission cable or with baseband microwave. The $c_n$ spectrum can be translated to any desired frequency to suit the particular communications medium.

A particular advantage of the above described correlative polybinary encoding technique is that the Nyquist data transferring rate of two symbols per second of hertz of bandwidth is achievable with corresponding reduction in signal-to-noise. Moreover, unlike straight binary techniques which have a zero tolerance to any increase in data rate above the Nyquist rate, this correlative technique is reasonably insensitive to moderate increases in transmission speed above the Nyquist rate. Moreover, SSB is possible since the DC component of the $c_n$ signal is suppressed. The use of a SSB modulated signal is advantageous because its modulation product (960–2,400 Hz) requires the same bandwidth as the modulating signal (0–1,440 Hz). When combined with single sideband modulation this correlative encoding permits a resulting speed advantage over prior art binary FSK of approximately 4:1.

Referring back to FIG. 2, it is apparent that there are four input signals being applied to linear amplifier 62. The first input signal includes the frequency shifted, ternary or information signal having components in the spectrum between 960 Hz and 2,400 Hz. The spectrum of the frequency shifted ternary signal is equal to the 2,400 Hz carrier frequency minus the selected frequency spectrum appearing at the output of low pass filter 56. The other three signals are the 480 Hz pilot, the 960 Hz pilot, and the 2,400 Hz carrier. The composite signal at output 17 of linear amp 62, which contains the same four input signals, is coupled to the input of the receiver-encoder in FIG. 10 by a transmitting medium which may include multiplex and microwave equipments of the kind well-known in the art. The modulator of the multiplex system cooperates with the transmitter-encoder of FIG. 2 and includes a master frequency oscillator from which a transforming frequency is derived which is mixed with the composite information signal at output 117 of linear amp 62 to thereby transform the composite signal into the microwave baseband region so that it can be relayed to the microwave receiver and multiplex demodulator which cooperates with the receiver-decoder of FIG. 9. A similar master oscillator is included in the demodulator which ideally develops the same transforming frequency which when mixed with the transformed composite signal restores it to its original frequency spectrum. If the transforming frequency of the microwave receiver does not equal the transforming frequency of the microwave transmitter, for example, because of mistuning of either the transmitter master oscillator or the receiver master oscillator, the composite signal applied to the receiver-decoder will not have components of exactly the same frequency as the components of the composite signal developed at output 117 of linear amplifier 62. Each component will be shifted the same amount. More specifically, each of the frequencies of the composite signal at the receiver-decoder will be shifted with respect to the composite signal at the output of the transmitter-encoder an amount equal to the difference between the master oscillator of the modulator and the master oscillator of the demodulator. As will subsequently be explained, this unwanted frequency shift is eliminated from each of the components of the composite signal by the receiver-decoder.

Figures 9, 10:
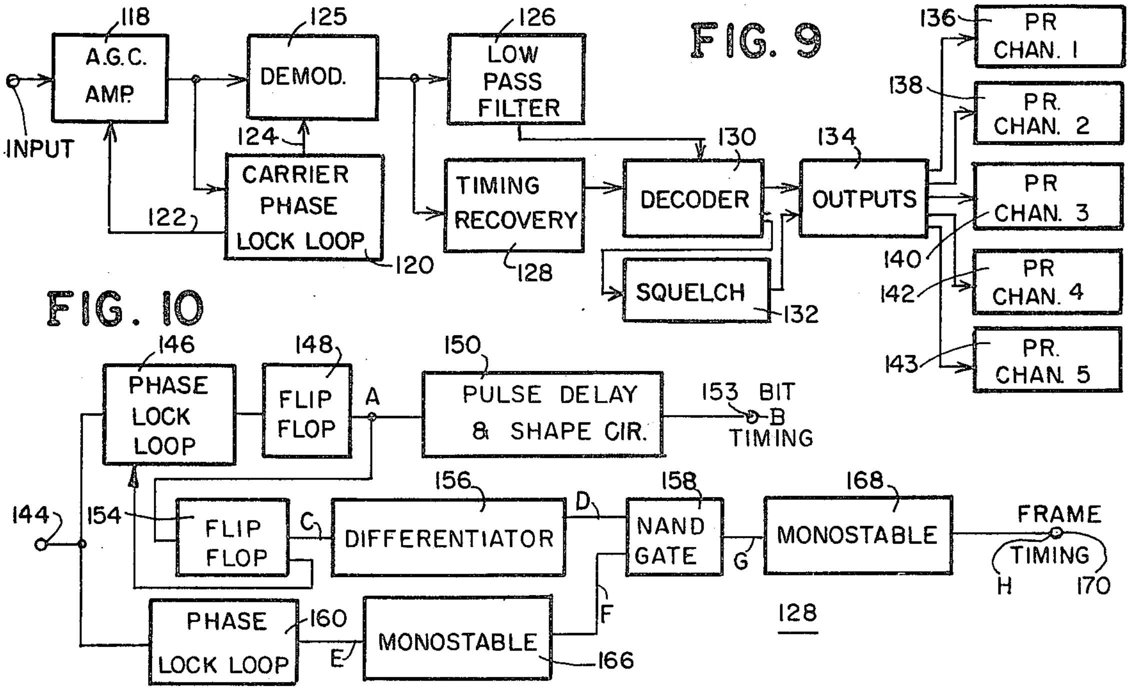
FIG. 9 is a block diagram of the receiver-decoder of the invention.
FIG. 10 is a block diagram of the bit and frame timing recovery circuitry of the system shown in FIG. 9.

FIG. 9 is a block diagram of the receiver-decoder of the information transferring system. The composite output of linear amplifier 62 which might be undesirably shifted in frequency is amplified by automatic gain control (AGC) amplifier 118 of the receiver. The input of carrier, phase lock loop demodulator or frequency selective circuit 120 is connected to the output of AGC amplifier 118, and its outputs 122 and 124 are respectively connected to the gain control element of amplifier 118 and to one of the inputs of balanced demodulator 125. An AGC signal, developed by carrier phase lock loop 120 is applied from output 122 to control the gain of amplifier 118 so that the amplitude of the composite signal at the output of amplifier 118 is a known, predetermined value. Another output having a frequency equal to the shifted carrier signal of circuit 120 is applied to the input of balanced demodulator 125.

Balanced demodulator 125 mixes the carrier frequency, perhaps having the unwanted frequency shift with the frequency shifted pilot frequencies and the data frequency band having unwanted frequency shift thereby generating sum and difference mixing frequencies. The unwanted frequency shift will not be created in the difference mixing frequencies because the difference frequencies depend on the relative frequencies of the carrier with respect to the plates and the data band or encoded ternary signal. For example, assume that the master oscillator of the modulator is operating at a frequency which is 10 cycles per second greater than the frequency of the demodulator master oscillator. This will result in a carrier frequency of 2,410 Hz, pilot frequencies of 490 Hz and an information data band lying between 870 Hz and 2,410 Hz being applied to the input of the receiver-decoder. A first difference mixing signals at the output of demodulator 125 is equal to 1,440 Hz or the difference between the 2,410 Hz carrier and the 970 Hz pilot tone. A second difference mixing signals at the output of demodulator 125 is equal to 1,920 Hz or the difference between the 2,410 Hz carrier and the 490 Hz pilot tone. Furthermore, a difference mixing band is provided at the output of demodulator 125 between 0 and 1,440 Hz which is equal to the difference between the 970 to 2,410 Hz information signal and the 2,410 carrier frequency. It is pointed out that the mixing band, therefore, lies in a frequency spectrum corresponding to the frequency spectrum of the signal developed at the output of low pass filter 56 of FIG. 2 even though it has been transferred through a medium which has been assumed to produce arbitrary frequency shift. The first and second difference mixing signals will likewise have the same frequencies of 1,440 and 1,920 regardless of the frequency shift provided by the transmitting medium.

One output of demodulator 125 is connected to the input of low pass filter 126 which selects out the lower sideband of the mixing product of the carrier signal and the data frequency band which includes frequencies between 0 and 1,440 Hz and which contains the filtered, ternary signal $c_n$. Another output of demodulator 125 is connected to the input of timing recovery block 128 which utilizes the difference of the carrier and pilot frequencies to reconstruct the frame and bit timing. The filtered signal $c_n$ and the frame and bit timing pulses are applied to decoder 130 which includes a slicer or full wave rectifier for transforming the signal $c_n$ back into the serial data information sequency $a_n$ and, a bit separator routes or separates the serial bits into parallel paths leading to squelch circuit 132 and through output switching circuit 134 to protective relays 136, 138, 140, 142 and 143. Timing recovery circuit 128 and decoder 130 will be described in more detail below.

A block diagram of timing recovery block 128 is illustrated in FIG. 10. Input terminal 144 is connected to the output of demodulator 125. The bit timing recovery circuitry includes the series connection of phase lock loop 146, flip-flop 148 and pulse delay and shape circuit 150. The purpose of this circuitry is to provide bit timing pulses at output terminal 153 which have time durations therebetween corresponding to the time durations during which combiner 50 of FIG. 2 sequentially samples the outputs of monitor signal generator 52, and protective relays 40 through 48. As has been previously pointed out, the bit timing pulses have a repetition rate of 2,880 pps.

One of the pilot frequencies and the carrier frequency developed by frequency and timing generator 54, is selected such that the mixing signal formed by the difference therebetween at the output of demodulator 125 is related to the desired bit timing frequency by being either a multiple or fraction thereof and by being synchronized therewith. For instance, the 1,440 Hz mixing frequency comprised of the difference between the 2,400 Hz carrier and the 960 Hz pilot is equal to one-half of and is in phase synchronism with the desired 2,880 Hz bit timing signal. Phase lock loop 146 is synchronized by the 1,440 Hz difference frequency and develops a phase locked signal at a frequency of 5,760 Hz at its output. Flip-flop 148 is triggered by the 5,760 Hz signal and divides the frequency thereof in half to produce a square wave or control signal A, shown in FIG. 11, having a repetition rate equal to the repetition rate of the desired bit timing signal. Pulse delay and shape circuit 150 delays and shapes output A of flip-flop 148 to provide a bit timing trigger waveform B of FIG. 11.

In general, the frame timing pulses are developed by utilizing both a control signal derived from the bit timing circuitry and the other mixing difference frequency i.e., the 1,920 Hz mixing product formed by the difference between the 2,400 Hz carrier and 480 Hz pilot. The series circuit comprised of flip-flop 154 whose input is connected to the output flip-flop 148, and differentiator 156 develop a signal derived from the bit timing circuitry and apply it to one input of NAND gate 158. The series circuit comprised of phase lock loop or frequency selective device 160 and monostable 166, which is connected between input terminal 144 and the other input of NAND gate 158, develops a signal having a repetition rate difference with respect to the signal at the output of differentiator 156 which is equal to the desired frame timing repetition rate. NAND gate 158, subtracts these two signals to provide a frame timing waveform at its output which is of the desired frequency and which is phase locked to the bit timing pulses. Monostable 168 which is connected to the output of NAND gate 158 is triggered by the signal of the output of NAND gate 158 to provide the desired frame timing pulses at output 170.

Figure 11:
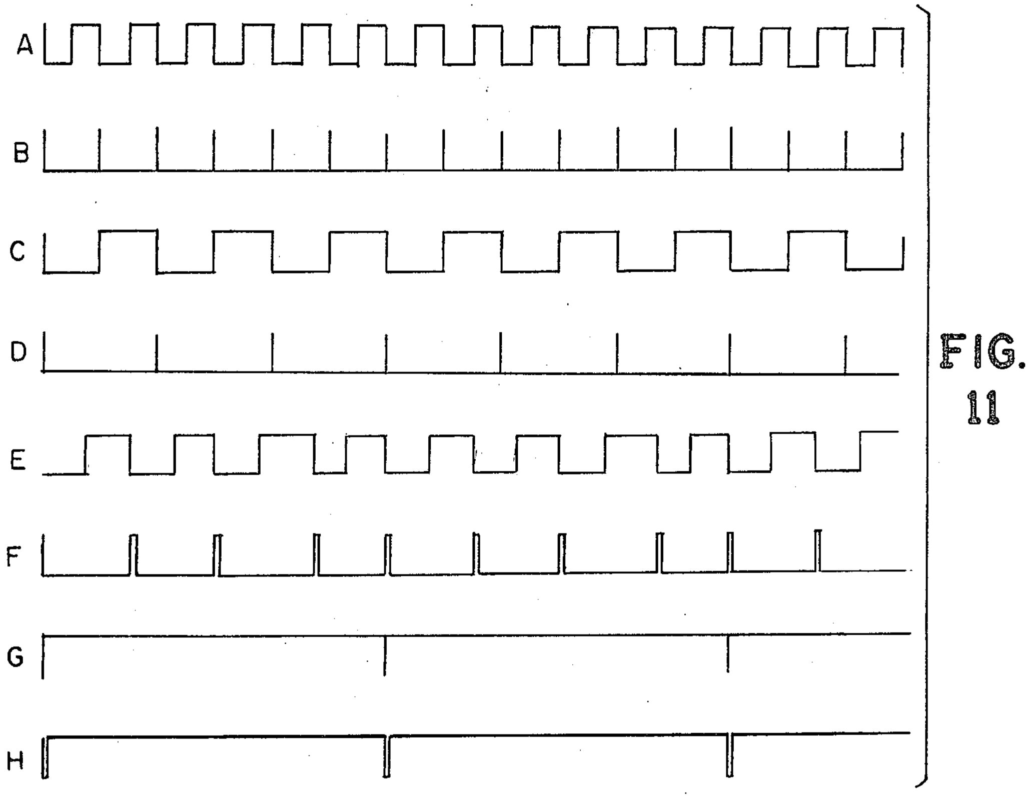
FIG. 11 illustrates timing waveforms useful in understanding the operation of the bit and frame timing recovery circuitry of FIG. 10.

More particularly, flip-flop 154 divides the repetition rate of signal A, at the output of flip-flop 148, in half to provide square wave C of FIG. 11 having a repetition rate of 1440 pps at its output. Waveform C is synchronized with the bit timing pulse waveform B. Differentiator 156 differentiates wave C to produce differentiated signal D of FIG. 11.

Phase lock loop 160 is synchronized by and provides the 1,920 Hz mixing product at its output. Monostable 166 is triggered by the negative-going excursions of waveform E to provide pulse train F of FIG. 11 comprised of pulses having constant predetermined durations and a repetition rate of 1,920 pps. The output of monostable 166 is applied to the other input of NAND gate 158. In response to the coincidence of positive-going excursions of waveform D, which have a repetition rate of 1,440 pulses per second, and the output F of monostable 166, which has a repetition rate of 1,920 pulses per second, NAND gate 158 provides a frame timing triggering signal G of FIG. 11 at its output having a repetition rate of 480 pps. Hence, NAND gate 158 digitally substracts waveforms D and F to form the triggering signal G which triggers monostable 168 to provide the frame timing pulse train H at output 170.

Figure 12:
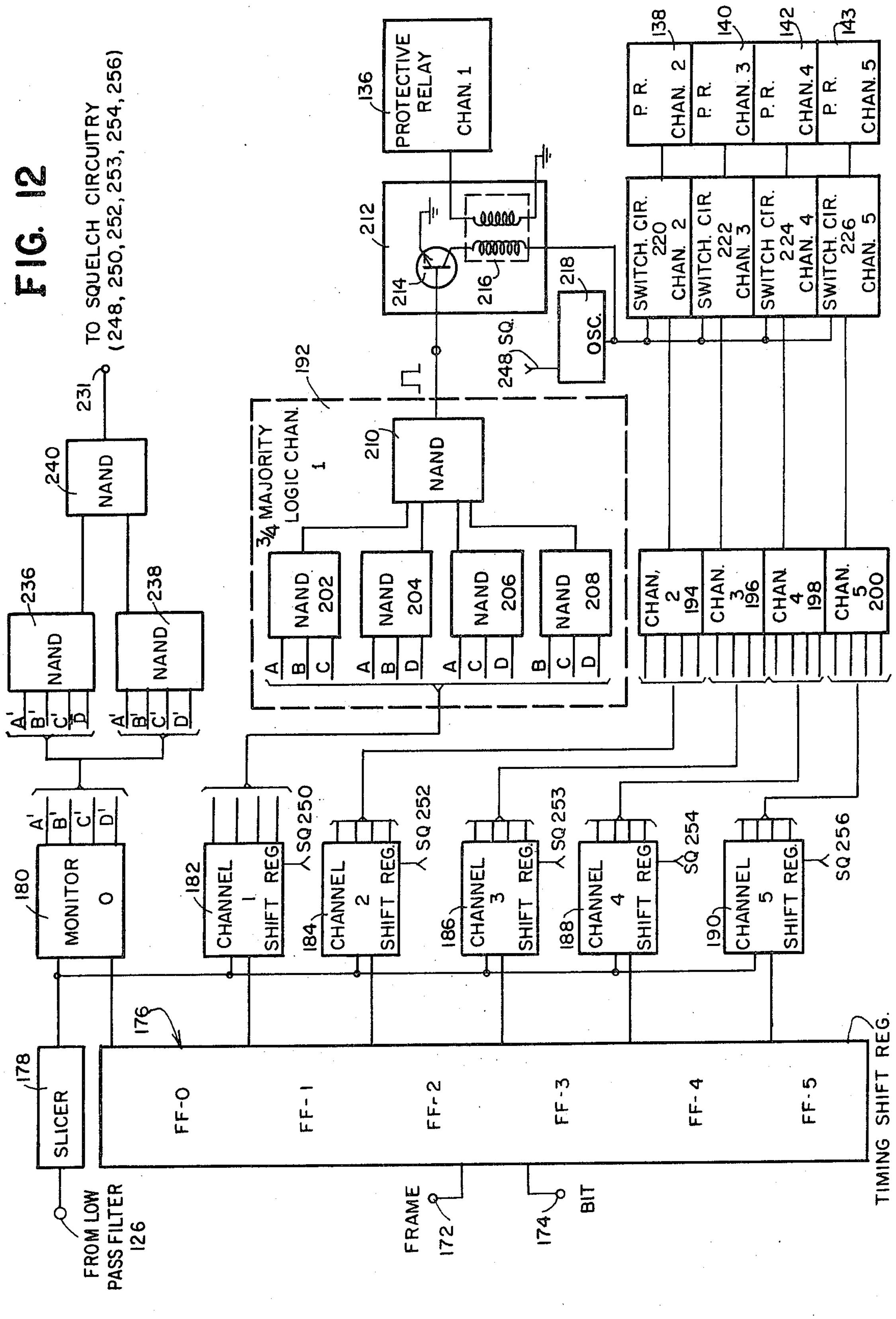
FIG. 12 is a block diagram of the decoder, security and output portions of the receiver-encoder shown in FIG. 9.

The block diagram of FIG. 12 illustrates the decoding and squelch or security operations. Shift register 176 may be comprised of a string of six cascaded flip-flops. Input 172 and toggle terminal 174 of shift register orbit separator 176 are respectively connected to receive the frame and bit timing pulses from timing recovery block 128. The bit timing pulses toggle a given frame timing pulse through shift register 176. Decoder 130 includes slicer or full wave rectifier 178, the input of which is connected to the output of low pass filter 126. Slicer 178 full wave rectifies the $c_n$ signal thereby forming positive polarity or "1" pulses in response to both the −1 and +1 pulses thereof to thus reconstruct the serial $a_n$ signal therefrom at its output. A first input of monitor channel (channel 0) shift register 180 is connected to the output of slicer 178 and a second input is connected to the output of the first flip-flop ($FF_0$) in shift register 176. Channel 1 shift register 182 likewise has a first input connected to the output of slicer 178 and a second input connected to the second flip-flop ($FF_1$) of shift register 176. Similarly, shift registers 184, 186, 188 and 190 for respective channels 2, 3, 4 and 5 all have one input connected to the output of slicer 178 and another input respectively connected to the outputs of the third ($FF_2$), fourth ($FF_3$), fifth ($FF_4$) and sixth ($FF_5$) flip-flops in shift register 176.

In operation, during a period of time corresponding to the duration between $t_0$ and $t_1$ of FIG. 4, the frame pulse in shift register 176 is applied to the toggle input of shift register 180 thereby allowing the monitor signal state occurring during that time to be placed therein. At time $t_1$, a bit timing pulse shifts the frame timing pulse in shift register 176 to the toggle input of channel 1 shift register 182, so that the portion of the $a_n$ signal originating from protective relay 1 which occurs during the time bounded by $t_1$ to $t_2$ is entered into shift register 182 from slicer 178. In a similar manner the consecutive portions of $a_n$ signal occurring within the time durations defined by $t_2$ and $t_3$, $t_3$ and $t_4$, $t_4$ and $t_5$, and $t_5$ and $t_0$ are respectively entered in a sequential manner into shift registers 184, 186, 188 and 190. The foregoing cycle continues to repeat as long as frame and bit pulses are being applied to timing shift register 176 and $a_n$ signals are being supplied to the monitor and channel shift registers.

It is possible for noise signals or other causes to result in an erroneous or false bits being stored in the channel shift registers. Because of the nature of their sources, such errors tend to occur in sequence in the monitor signal and in the channel signals. To prevent such error bits from causing an undesired triggering of protective relays, the receiver-decoder shown in FIG. 12 contains independent and simultaneously operating security circuits. One security circuit is comprised of a plurality of three-out-of-four majority logic circuits which each monitor that output of one of channel shift registers 182 through 190 to verify that three change of state initiating signals are received before a change of state signal is applied to one of the protective relays coupled thereto. Another security circuit is comprised four-out-of-four logic which determines whether the format of the signal code stored in monitor channel shift register 180 conforms to the known, predetermined code developed by monitor signal generator 152. If errors occur in the monitor signal code, a squelch signal developed at squelch output terminal 231 is applied to squelch input terminals 250 through 256 to instantaneously reset the channel shift registers.

A block diagram 192 of the three-out-of-four majority logic for channel 1 shift register 182 is illustrated in FIG. 10. The block diagrams for the majority logic in blocks 184 through 200 which respectively monitor the outputs of channel shift registers 184 through 190 are the same as shown for block 192. The three-out-of-four majority logic for channel 1 is comprised of NAND gates 202 through 208. The inputs of the NAND gates are distributively connected to the A, B, C, and D outputs of shift register 182. The gates are arranged such that if any of the three-out-of-four possible outputs of register 182 is in a "1" state, which indicates a change of state initiating or control signal has been developed at channel 1, protective relay 40 of FIG. 2 for at least three successive sampling periods, one of the NAND gates will produce a "1" or change of state output. The outputs of NAND gates 202 through 208 are connected to the input of NAND gate 210. Switching circuit 212 for channel 1 includes transistor 214 whose base is connected to the output of NAND gate 210 and whose collector is coupled through the primary of isolating transformer 216 to the output of normally free-running oscillator 218.

When no change of state initiating signals are being transferred from protective relay 40, provided no error signals are being received, the inputs to NAND gates 202 through 208 will consist of 0's. Therefore, all of corresponding outputs of NAND gates 202 through 208 will be "1's" and the output of NAND gate 210, therefore, will normally be a "0" thereby biasing transistor 214 in the non-conductive or off condition. However, if any three of the four possible A, B, C or D outputs of shift register 182 are in the "1" state, the output of one of NAND gates 202 through 208 will be a "0" thereby causing a "1" at the output or change of state control signal at the output of NAND gate 210. This change of state signal forward biases transistor 214 thereby placing a ground or reference potential at the end of the primary winding of transformer 216, which enables the coupling of a signal from oscillator 218 through transformer 216 to protective relay 136, thereby initiating its operation in response to the trip condition. Likewise, if any three out of the four possible outputs for any of the other channel shift registers 184 through 190 are in the "1" state, the three-out-of-four majority logic circuitry in blocks 194 through 200 will initiate corresponding switching circuits 220 through 226 to enable the output of oscillator 218 to initiate operation of corresponding protective relays 138 through 143.

Squelch circuitry operating on the A', B', C' and D' outputs of monitor channel shift register 180 provides additional security features. This circuitry includes NAND gates 236 and 238 which are connected to the outputs of monitor channel shift register 180. NAND gate 240 is connected to the outputs of NAND gates 236 and 238.

As previously pointed out, a monitor signal M of known pulse code shown in FIG. 4, is stored in monitor channel shift register 180. The level of the monitor signal alternates between the "1" and "0" states in synchronism with the occurrence of each successive frame. Consequently, if the system is functioning properly the signals at the A', B', C' and D' outputs of monitor channel shift register 180 will alternate between A, $\overline{B}$, C, $\overline{D}$, and $\overline{A}$, B, $\overline{D}$, C. NAND gates 236 and 238 monitor the output states of shift register 180. NAND gate 236 is arranged to provide a "0" output only when the A', $\overline{B}$', C', $\overline{D}$' code is applied thereto and NAND gate 238 is arranged to provide a "0" output only when the $\overline{A}$', B', $\overline{C}$ , D signal is applied thereto. Therefore, if no false error bits are being decoded for the monitor channel, one of either NAND gates 236 or 238 will always have a "1" output and the other will have a "0" output. If the outputs of NAND gates 236, 238 are both in the "1" state, thereby indicating that an erroneous bit has occurred in the monitor signal and, hence, possibly in the data for the channels, NAND gate 240 provides a "0" or squelch signal at its output 231. Squelch output terminal 231 is connected to and applies the squelch signal to squelch input terminal 248 of oscillator 212 and squelch input terminals 250, 252, 253, 254 and 256 of channel shift registers 182, 184, 186, 188, and 190. Oscillator 218 is rendered inoperative and the channel shift registers are reset in response to the squelch signals so that protective relays 136 through 143 are not undesirably activated by noise signals.

Although the data transferring system has been described as transmitting alarm and control signals between protective relays operating in a direct transfer trip (DDT) power transmission line protective scheme, it can also transfer the phase of continuous 60 cycle signals between protective relays operating in a phase comparison (PC) power transmission line protective scheme. In a phase comparison protective scheme the respective outputs of protective relays 40 through 48 may be 60 cycle square waves representing the phase of the signals at a first plurality of selected points on power transmission lines. Each of these square waves is sampled each frame to provide a phase information signal which is transferred in the aforementioned manner to shift register 142. The outputs of the shift register, however, would not pass through the channel logic but could be connected directly from the output of timing shift register 176 to protective relays 136 through 143 wherein the transmitted phases could be compared with the phases of local signals at selected points on corresponding power transmission lines to determine whether the power transmission lines are conducting properly. In addition, it should be apparent to one skilled in the art that the data transferring system could be utilized to transfer digital information from a plurality of sources providing digital information of any kind so long as the information rates thereof are compatible with the monitor signal rate and sampling rate, i.e., so long as the digital information rate from each of the data sources is no greater than the repetition rate of the monitor signal multiplied by the number of data sources plus one.

What has been described, therefore, is a binary data transmission system which facilitates secure information transfer at relatively high speeds, as compared to prior art FSK/FDM systems in a constrained bandwidth imposed, for example, by a voice band transmission line. The system, while being particularly adapted to providing communication between protective relays, could be advantageously employed in any application where secure high speed data transfer in a relatively constrained bandwidth is desirable. The system further implements a unique frame and bit timing recovery technique which is not affected by frequency shift from information and control signals possible caused by translation errors in the communications link.

We claim:

1. A timing system for use with a data transferring system having, a data source developing a serial bit stream which has a frame frequency and time intervals between successive frames each including a predetermined number of bits occurring at a bit frequency, communication means transferring signals applied to the input thereof from the data source to its output which is coupled to a bit processing circuit which requires control signals at the frame and bit frequencies at other inputs thereof, the communication means being subject to producing a frequency shift in signals transferred thereby, the timing system including in combination:

timing generator means included in the data source and providing first, second and third signals having first, second and third respective frequencies at an output terminal thereof and all of which are synchronized with the frequency of the serial bit stream;

first circuit means connecting said output terminal of said timing generator means to the input of the communication means so that the communication means can transfer said first, second and third signals to the output thereof;

first frequency selective means having an input connected to the output of the communication means and providing said first signal at its output;

mixing means having a first input connected to said output of said first frequency selective means and receiving said first signal therefrom and a second input connected to the output of the communication means and receiving said second and third signals therefrom, said mixing means providing at the output thereof first and second mixing signals having frequencies respectively equal to the difference between said first frequency and said second frequency and to the difference between said first frequency and said third frequency, said first, second and third signals having frequencies selected so that said first and second mixing signals have frequencies which are multiples of the frame frequency;

second frequency selective means connected to said output of said mixing means being responsive to said first mixing signal to provide a bit timing signal at its output at a frequency equal to the bit frequency; third frequency selective means connected to said output of said mixing means being responsive to said second mixing signal to provide a frame timing signal at its output at a frequency equal to the frame frequency; and coupling means connected between said outputs of said second and third frequency selective means and the bit processing circuit for applying the bit and frame timing signals to the bit processing circuit.

2. The timing system of claim 1 wherein said second frequency selective means includes a first phase lock loop coupled to said output of said mixing means, said first phase lock loop being synchronized by said first mixing signal to provide a first phase locked signal at its output of a frequency which is a multiple of the bit timing frequency, said second frequency selective means also including a first frequency divider means having an input connected to said output of said first phase lock loop and which divides the frequency of said first phase locked signal to provide a first control signal having the form of a first square wave at the output thereof; and first circuit means including pulse delay and shape means connected to said output of said first frequency divider means, said first circuit means providing the bit timing signal at an output thereof.

3. The timing system of claim 2 wherein said third frequency selective means includes: a second phase lock loop coupled to said output of said mixing means, said second phase lock loop being synchronized by said mixing signal to provide a second phase locked signal at its output having a frequency which is a given multiple of the frequency of the frame timing pulses; and monostable means responsive to one polarity of said excursions of said second phase locked signal to generate a second control signal at the output thereof which facilitates the generation of the frame timing signal.

4. The timing system of claim 3 wherein said third frequency selective means further includes:

gate means having first and second inputs and an output, said second input of said gate means being connected to said output of said monostable means to receive said second control signals;

second circuit means connecting said first input of said gate means to said output of said first frequency divider means so that said first control signals are applied thereto;

said gate means developing third control signals in response to the simultaneous occurrence of said first and second control signals, said third control signals having an interval of time therebetween equal to the frame time interval; and trigger circuit means responding to said third control signal to develop the frame timing signal at its output.

5. The timing system of claim 4 wherein said second circuit means includes:

second frequency divider means whose input is connected to said output of said first frequency divider means, and which provides at the output thereof a fourth control signal having a frequency which is the next lower order multiple of the frequency of the frame timing signal than said given multiple of said second phase locked signal;

differentiator means having its input coupled to said output of said second frequency divider means and its output connected to said first input of said gate means, said first differentiator means differentiating said fourth control signal to provide a first differentiated signal; and said gate responding to the simultaneous occurrence of said first differentiated signals and said second control signals to provide said third control signals at its output which are synchronized with the bit timing and which have an interval of time therebetween equal to the frame interval.

6. A timing recovery system for use with a data transferring system having an encoder and a decoder, the encoder including a data source developing a serial bit stream having frame time intervals each including a predetermined number of bits, communication means transferring signals from the encoder to the decoder, the communication means being subject to producing a frequency shift in the signals, the decoder having a bit processing means receiving the serial bit stream and which requires frame and bit timing pulses to facilitate the operation thereof, the bit timing pulses having a first time interval therebetween equal to the time interval between bits, the frame timing pulses being synchronized with the bit timing pulses and having a second time interval therebetween equal to the frame time interval, the timing recovery system including in combination:

timing generator means included in said encoder and providing control signals to the data source, a carrier signal and first and second pilot signals which are all synchronized with each other; said carrier signal and said first and second pilot signals being transferred through the communication means to an output terminal thereof;

first frequency selective means included in the decoder and having an input terminal connected to the output terminal of the communication means, said first frequency selective means providing said carrier signal at its output;

mixing means included in the decoder and having a first input connected to said output of said first frequency selective means and receiving said carrier signal therefrom, said mixing means having a second input connected to the output of the communication means and receiving said first and second pilot signals therefrom, said mixing means providing at the output thereof first and second mixing signals having frequencies respectively equal to the difference between said carrier frequency and said first pilot frequency and between said carrier frequency and said second pilot frequency, said carrier and said first and second pilot signals having frequencies selected so that said first and second mixing signals have frequencies which are multiples of the frequency of the frame timing pulses; second frequency selective means having an input connected to said output of said mixing means being responsive to said first mixing signal to provide a first control signal at the output thereof having a frequency equal to said bit timing frequency;

first circuit means coupled to the output of said second frequency selective means and producing the bit timing pulses at its output in response to said first control signal;

third frequency selective means having an input connected to said output of said mixing means and being responsive to said second mixing signal to provide a second control signal at the output thereof;

gate means having a first input coupled to said output of said second frequency selective means and a second input coupled to said output of said third frequency selective means and developing third control signals in response to the simultaneous occurrence of said first and second control signals which have an interval of time therebetween equal to the frame time interval;

first trigger circuit means responding to said third control signal to develop the frame timing pulses at its output; and coupling means applying the bit and frame pulses to the bit processing means.

7. The timing recovery system of claim 6 wherein said second frequency selective means includes a first phase lock loop coupled to said output of said mixing means, said first phase lock loop being synchronized by said first mixing signal to provide a first phase locked signal at its output of a frequency which is a multiple of the bit timing frequency, said second frequency selective means also including a first frequency divider means having an input connected to said output of said first phase lock loop and which divides the frequency of said first phase locked signal to provide said first control signal at the output thereof, said first control signal having the form of a first square wave; and said first circuit means including pulse delay and shape means connected to said output of said first frequency divider means, said first circuit means providing the bit timing pulses at the output thereof.

8. The timing recovery system of claim 6 wherein said third frequency selective means includes:

a second phase lock loop having an input and an output, said input being coupled to said output of said mixing means, said second phase lock loop being synchronized by said second mixing signal to provide a second phase locked signal at said output thereof which is a given multiple of the frequency of the frame timing pulses; and first monostable means having an input connected to said output of said second phase lock loop and an output, said second monostable means being responsive to said second phase locked signal to generate said second control signal at said output thereof.

9. The timing recovery system of claim 8 further including second circuit means coupling said output of said second frequency selective means to said first input of said gate means, said second circuit means having:

second frequency divider means having an input coupled to said output of said second frequency selective means, said second frequency divider means providing at the output thereof a fourth control signal having a frequency which is the next lower order multiple of the frequency of the frame timing pulses than said given multiple of said second phase locked signal;

first differentiator means having an input coupled to said output of said second frequency divider means and its output connected to said first input of said gate means, said first differentiator means differentiating said fourth control signal to provide a first differentiated signal;

said gate responding to the simultaneous occurrence of said first differentiated signal and said second control signal to provide said third control signals at its output which are synchronized with the bit timing and which have an interval of time therebetween equal to the frame interval; and said first trigger circuit means including a second monostable multivibrator means which responds to said third control signal to provide the frame timing pulses at its output.

10. The timing recovery system of claim 9 wherein said fourth control signal has a frequency which is the next higher order multiple than said given multiple of said frame timing signal.

11. A data transferring system comprised of an encoder and a decoder, including in combination:

a plurality of data sources each providing at its output a digital signal to be transferred;

timing generator means included in the encoder and providing combiner control signals at a first output thereof, a carrier signal and a first and second pilot signals respectively developed at second, third and fourth outputs thereof, said combiner control, carrier, first and second signals all being synchronized with each other; combiner means included in the encoder having a set of sampling inputs and a timing input, said sampling inputs being connected to said outputs of said plurality of data sources and said timing input being connected to said first output of said timing generator means, said combiner means sequentially sampling each of said digital signals in response to said combiner control signals for a bit time interval and all of said plurality of data sources during a frame time interval to form a serial, binary bit stream therefrom at its output;

encoding means included in the encoder and having an input connected to said output of said combiner and transforming said serial bit stream into an information waveform at its output;

communication means having an input connected to said output of said encoding means and transferring said information waveform and said carrier and said first and second pilot signals to an output thereof, said communication means capable of causing undesirable frequency shift in said carrier, and first and second pilot signals and said information waveform;

first frequency selective means included in the decoder and having an input connected to said output of said communication means, said first frequency selective means deriving said carrier signal at its output;

mixing means included in the decoder and having a first input thereof connected to said output of said first frequency selective means and receiving said carrier signal therefrom and a second input connected to said output of said communication means for receiving said first and second pilot signals, said mixing means providing first and second mixing signals at its output having frequencies respectively equal to the difference between said carrier and said first pilot frequency and said carrier and said second pilot frequency, so that any frequency shift caused by said communication means in said carrier and said first and second pilot frequencies is not created in said first and second mixing signals;

second frequency selective means connected to said output of said mixing means being responsive to said first mixing signal to provide a first control signal at the bit timing frequency at the output thereof;

third frequency selective means connected to said output of said mixing means being responsive to said second mixing signal to provide a second control signal at the output thereof;

gate means having a first input coupled to said output of said second frequency selective means and a second input coupled to said output of said third frequency selective means and developing a frame timing signal in response to the simultaneous occurrence of said first and second control signals;

decoding means also included in the decoder and deriving said serial bit stream at its output from said information waveform; and bit separator means having a first input coupled to said output of said decoding means to receive said serial bit stream and a second input coupled to said output of said gate means to receive said frame timing signal and a third input coupled to said output of said second frequency selective means to receive said bit timing signals, said bit separator means providing the binary bits from each of said plurality of data sources at each of a plurality of corresponding outputs thereof in response to said bit and frame timing pulses and said serial bit stream.

12. The data transferring system of claim 11 wherein:

each of said plurality of data sources includes measuring means for monitoring electrical quantities in a power transmission system, and each of said measuring means developing one of said digital signals in response to said quantities, and, each of a plurality of protective means is coupled to each of said outputs of said bit separator means, said protective means selectively removing electrical power from said power transmission system in response to a digital signal having a predetermined code.

13. The data transferring system of claim 11 wherein said encoding means has a polybinary correlative encoding means including:

first signal means having an input connected to said output of said combiner means and an output, said first signal means forming a first encoded signal at said output thereof comprised of the modulo-two addition of said serial, binary bit stream and said first encoded signal which is delayed by two bits;

second signal means having an input connected to said output of said first signal means and an output, said second signal means forming a ternary signal at its output by adding the inverse of said first encoded signal delayed by two bits to said first encoded signal, said ternary signal thereby having a sine function frequency spectrum; and low pass filter means having an input connected to said output of said second signal means and selecting said frequency components of said ternary waveform within a first recurring portion of said sine function frequency spectrum to provide a filtered ternary waveform at its output.

14. The data transferring system of claim 13 wherein said encoding means further includes:

modulator means having a first input connected to said second output of said timing generator means and receiving said carrier signal therefrom, and a second input connected to said output of said low pass filter and receiving said filtered ternary signal therefrom, said modulator means amplitude modulating said carrier signal with said filtered ternary signal to produce a sideband at its output having a selected frequency spectrum; and bandpass filter means having an input connected to said output of said modulator means and providing said sideband at its output thereby forming said information waveform.

15. The data transferring system of claim 14 wherein said sideband has a frequency spectrum equal to the sum of the frequency components of said filtered ternary signal and said carrier signal.

16. The data transferring system of claim 15 wherein said mixing means included in said decoder, mixes said sideband with said carrier signal to provide a band of third mixing signals at its output having frequencies equal to the difference between the frequencies of said sideband and said carrier so that any frequency shift caused by said communication means in said sideband and in said carrier signal is not created in said third mixing signal.

17. The data transferring system of claim 16 wherein said decoding means includes slicing means connected between said output of said mixing means and said first input of said bit separator means, said slicing means converting said band of third mixing signals back into said serial bit stream applied to said first input of said bit separator means.

* * * * *